United States Patent
Chitkowski et al.

(10) Patent No.: US 12,426,570 B2
(45) Date of Patent: Sep. 30, 2025

(54) COLLAPSIBLE PET BED

(71) Applicants: John Chitkowski, Glen Ellen, IL (US); Kerry Chitkowski, Glen Ellen, IL (US)

(72) Inventors: John Chitkowski, Glen Ellen, IL (US); Kerry Chitkowski, Glen Ellen, IL (US)

(*) Notice: Subject to any disclaimer, the term of this patent is extended or adjusted under 35 U.S.C. 154(b) by 0 days.

(21) Appl. No.: 18/891,349

(22) Filed: Sep. 20, 2024

(65) Prior Publication Data

US 2025/0008919 A1    Jan. 9, 2025

Related U.S. Application Data

(63) Continuation-in-part of application No. 17/235,610, filed on Apr. 20, 2021, now abandoned.

(51) Int. Cl.
*A01K 1/035* (2006.01)

(52) U.S. Cl.
CPC .................. *A01K 1/0353* (2013.01)

(58) Field of Classification Search
CPC .......... A47D 9/005; A47D 1/02; A47D 1/103; A47D 7/002; A47C 17/64–86; A01K 1/02; A01K 1/0236; A01K 1/03; A01K 1/033; A01K 1/034; A01K 1/035; A01K 1/0353; A01K 29/00
See application file for complete search history.

(56) References Cited

U.S. PATENT DOCUMENTS

| | | | |
|---|---|---|---|
| 4,999,863 A * | 3/1991 | Kane | A47D 15/003 5/98.1 |
| 7,188,824 B2 | 3/2007 | Blake | |
| 7,614,362 B2 | 11/2009 | Dunn | |
| 7,621,236 B2 | 11/2009 | Steffey | |
| D640,015 S | 6/2011 | Birck | |
| 8,091,294 B2 | 1/2012 | Whalen | |
| 8,914,927 B1 * | 12/2014 | Leach | A47D 11/007 5/640 |
| 9,055,824 B2 | 6/2015 | Brown | |
| 10,029,598 B2 * | 7/2018 | Keck | B60R 9/06 |
| 10,104,864 B2 | 10/2018 | Murray | |
| 10,160,368 B2 * | 12/2018 | Keck | B60R 9/06 |
| 10,933,790 B2 * | 3/2021 | Keck | B65G 67/00 |
| 2004/0134433 A1 | 7/2004 | Holder | |
| 2006/0042548 A1 | 3/2006 | Thuralson | |
| 2006/0137266 A1 | 6/2006 | Whalen | |

(Continued)

FOREIGN PATENT DOCUMENTS

| | | |
|---|---|---|
| CN | 212924331 | 4/2021 |
| WO | WO2020097709 | 5/2020 |

*Primary Examiner* — Peter M Poon
*Assistant Examiner* — Danielle A Clerkley (57) ABSTRACT

A collapsible pet bed includes a clamshell container, a double hinge, legs, and stairs. The clamshell container includes a first tray and a second tray. The double hinge is designed to permit relative movement of the first tray and the second tray to: an open position in which the bottom wall of the first tray abuts the bottom wall of the second tray, and a closed position in which the side walls of the first tray abut the side walls of the second tray. The legs are extendable into an extended position and collapsible into a collapsed position for storage inside the clamshell container. The stairs are designed to be removably attached to the first tray to permit a pet to climb up into the first tray. The stairs are collapsible for storage inside the clamshell container.

16 Claims, 10 Drawing Sheets

(56) References Cited

U.S. PATENT DOCUMENTS

| | | |
|---|---|---|
| 2008/0127897 A1 | 6/2008 | Flannery |
| 2016/0198674 A1 | 7/2016 | Younger |
| 2017/0231400 A1 | 8/2017 | Patronaggio |
| 2019/0216047 A1* | 7/2019 | Wiegmann ........... A01K 1/0353 |
| 2021/0269295 A1 | 9/2021 | Chesbrough |

* cited by examiner

COLLAPSIBLE PET BED

CROSS-REFERENCE TO RELATED APPLICATIONS

I hereby claim the benefit under 35 U.S.C., Section 120, of U.S. application Ser. No. 17/235,610, filed Apr. 20, 2021.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to pet beds, such as for dogs and cats, and more particularly pertains to a new collapsible pet bed that can be adjusted between an elevated position in which the pet bed is adjacent an elevated surface, such as the top of a human bed, and a collapsed position for transport and storage, such as under a human bed. The collapsible pet bed includes stairs to permit a pet to climb up into the pet bed when in the elevated position and back down again.

(2) Description of Related Art Including Information Disclosed Under 37 CFR 1.97 and 1.98

The prior art relates to pet beds. The prior art, as best understood, does not disclose a collapsible pet bed that has a clamshell container design, legs that can be folded up and stored in the clamshell container, and stairs that can also be collapsed and stored in the clamshell container.

BRIEF SUMMARY OF THE INVENTION

An embodiment of the disclosure meets the needs presented above in a collapsible pet bed generally comprising a clamshell container, a double hinge, legs, and stairs. The clamshell container includes a first tray and a second tray. Each of the first tray and the second tray includes a bottom wall and side walls extending perpendicularly from the bottom wall. The double hinge pivotably connects the first tray and the second tray. The double hinge is designed to permit relative movement of the first tray and the second tray to: an open position in which the bottom wall of the first tray abuts the bottom wall of the second tray, and a closed position in which the side walls of the first tray abut the side walls of the second tray. The legs are pivotably attached to the second tray. The legs are extendable into an extended position to support the clamshell container a distance from a floor surface. The legs are collapsible into a collapsed position for storage inside the clamshell container. The stairs are designed to be removably attached to the first tray to permit a pet to climb up into the first tray when the clamshell container is in the open position and a distance from a floor surface. The stairs are collapsible into a collapsed position for storage inside the clamshell container.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 11 thereof, a new collapsible pet bed embodying the principles and concepts of an embodiment of the disclosure and generally designated by the reference numeral 10 will be described.

As best illustrated in FIGS. 1 through 11, the collapsible pet bed 10 generally comprises a clamshell container 12, a double hinge 14, legs 16, and stairs 18. The clamshell container 12 includes a first tray 20 and a second tray 22. Each of the first tray 20 and the second tray 22 includes a bottom wall 24 and side walls 26 extending perpendicularly from the bottom wall 24. The double hinge 14 pivotably connects the first tray 20 and the second tray 22. The double hinge 14 is designed to permit relative movement of the first tray 20 and the second tray 22 to: an open position 60 in which the bottom wall 24 of the first tray 20 abuts the bottom wall 24 of the second tray 22, and a closed position 62 in which the side walls 26 of the first tray 20 abut the side walls 26 of the second tray 22. The legs 16 are pivotably attached to the second tray 22. The legs 16 are extendable into an extended position to support the clamshell container 12 a distance from a floor surface. The legs 16 are collapsible into a collapsed position for storage inside the clamshell container 12. The stairs 18 are designed to be removably attached to the first tray 20 to permit a pet to climb up into the first tray 20 when the clamshell container 12 is in the open position 60 and a distance from a floor surface. The stairs 18 are collapsible into a collapsed position for storage inside the clamshell container 12.

The collapsible pet bed 10 further includes bedding 28 designed to be placed in the first tray 20 when the clamshell container 12 is in the open position 60. The bedding 28 is designed to be stored in the clamshell container 12 in the closed position 62. The bedding 28 can be integrally formed as part of the clamshell container 12, or can be separate from it, though regardless can be stored in the clamshell container 12.

The collapsible pet bed 10 further includes a latch mechanism 30 to releasably lock the first tray 20 and the second tray 22 together when in the closed position 62. The latch mechanism 30 includes a first latching member 32 mounted on one of the side walls 26 of the first tray 20 and a second latching member 34 mounted on a corresponding one of the side walls 26 of the second tray 22.

The collapsible pet bed 10 further includes a carrying handle 36 mounted on one of the side walls 26 of one of the first tray 20 and the second tray 22. In the exemplary embodiment, an additional carrying handle 36 is mounted on one of the side walls 26 of the other of the first tray 20 and the second tray 22.

Figure 4:
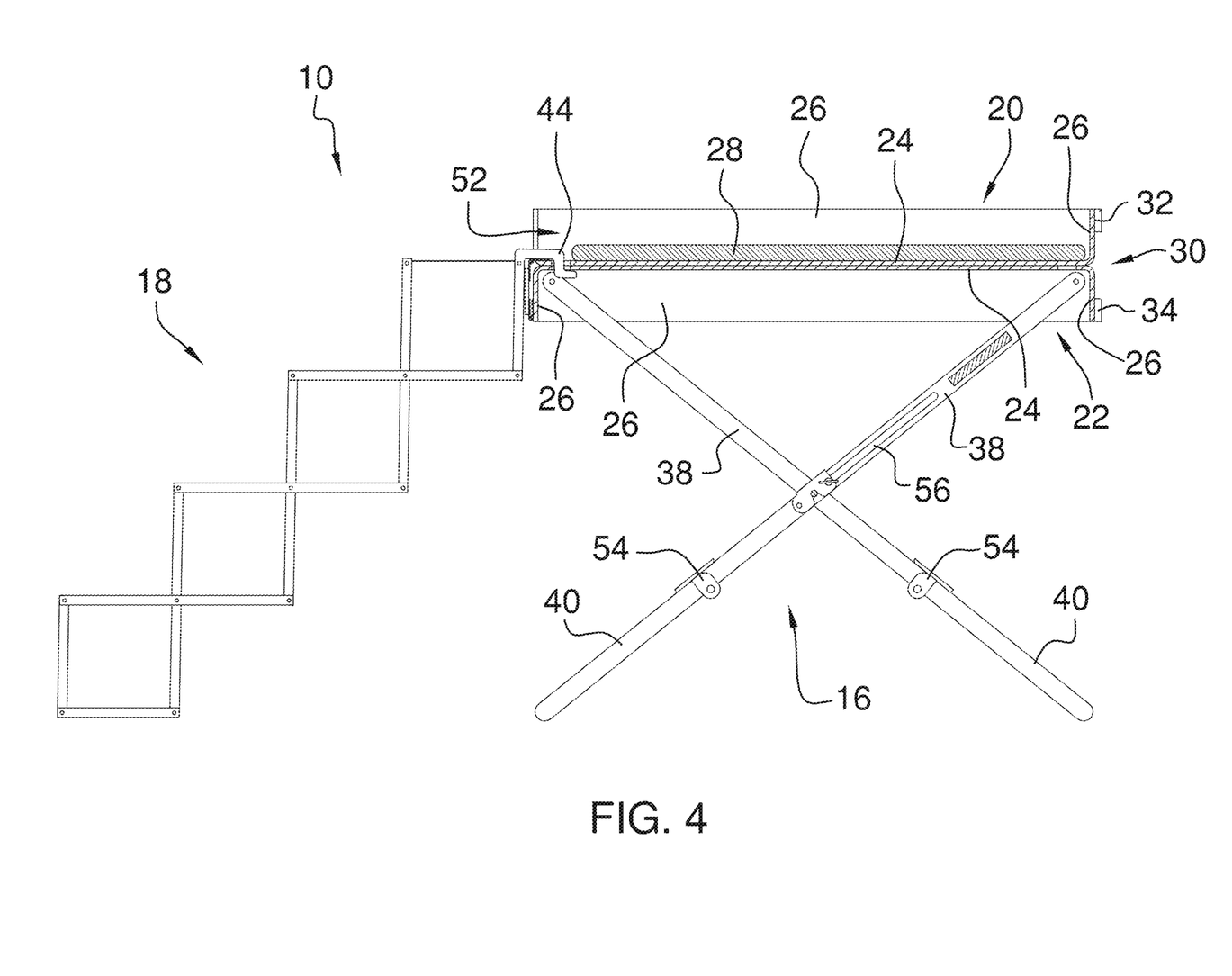
FIG. 4 is a side cross-sectional view of the embodiment of the disclosure in FIG. 3.
Figure 5:
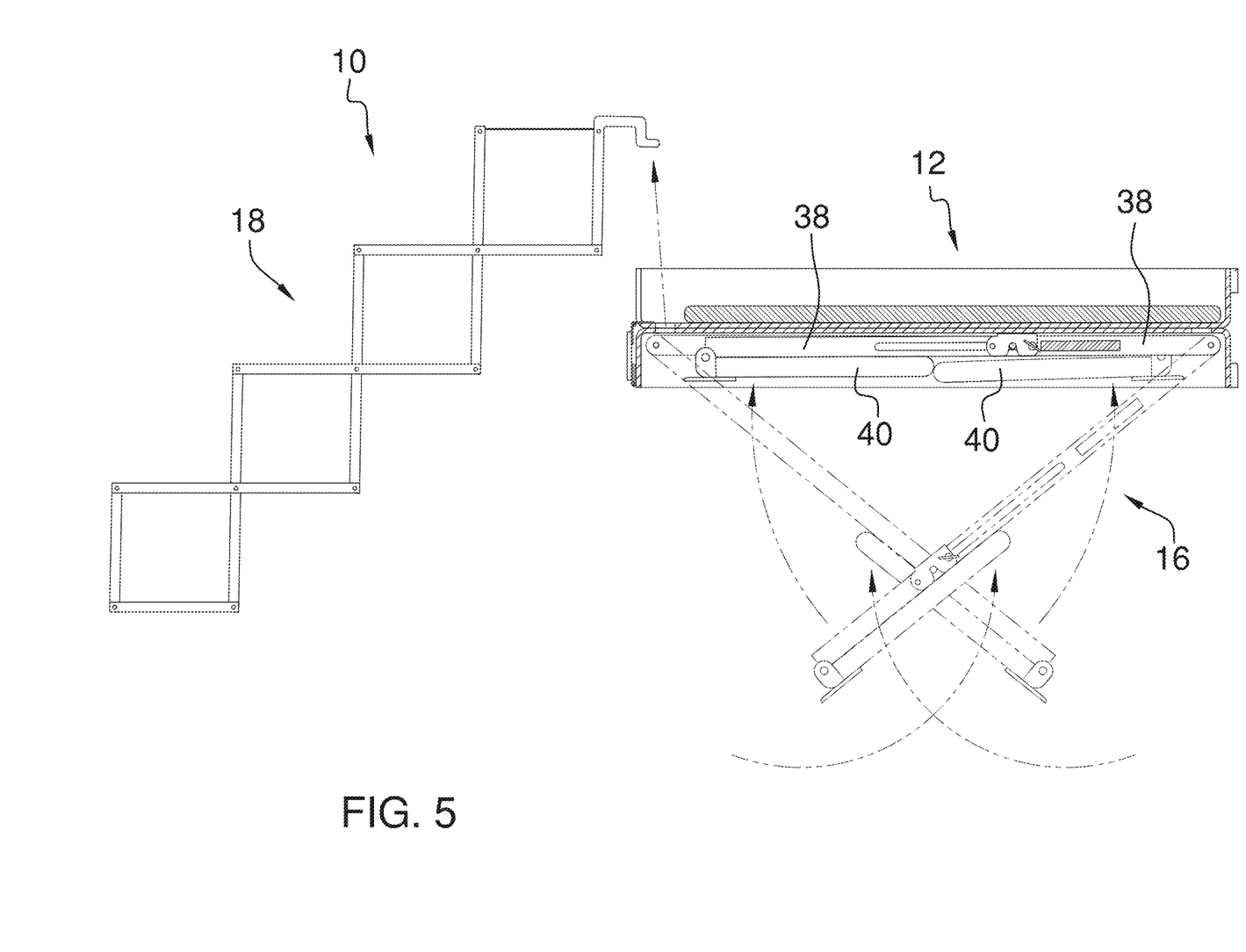
FIG. 5 is a side cross-sectional view of the embodiment of the disclosure in FIG. 3.

As seen in FIGS. 4 and 5, each of the legs 16 includes an upper leg portion 38 and a lower leg portion 40. The lower leg portion 40 is pivotably connected, such as by folding hinge 54, to the upper leg portion 38 to permit folding of the lower leg portion 40 parallel to and abutting the upper leg portion 38. In one possible embodiment, the legs 16 could be of a telescoping design. The legs 16 are divided into two pairs of legs 16, wherein each of the pairs of legs 16 is in a scissor orientation and pivotably connected by a pivot hinge 42. The pivot hinge 42 of each of the pairs of legs 16 is slidably connected to a corresponding one of the legs 16, such as by slot 56, to permit collapsing of the pairs of legs 16 to an essentially flat position.

Figure 1:
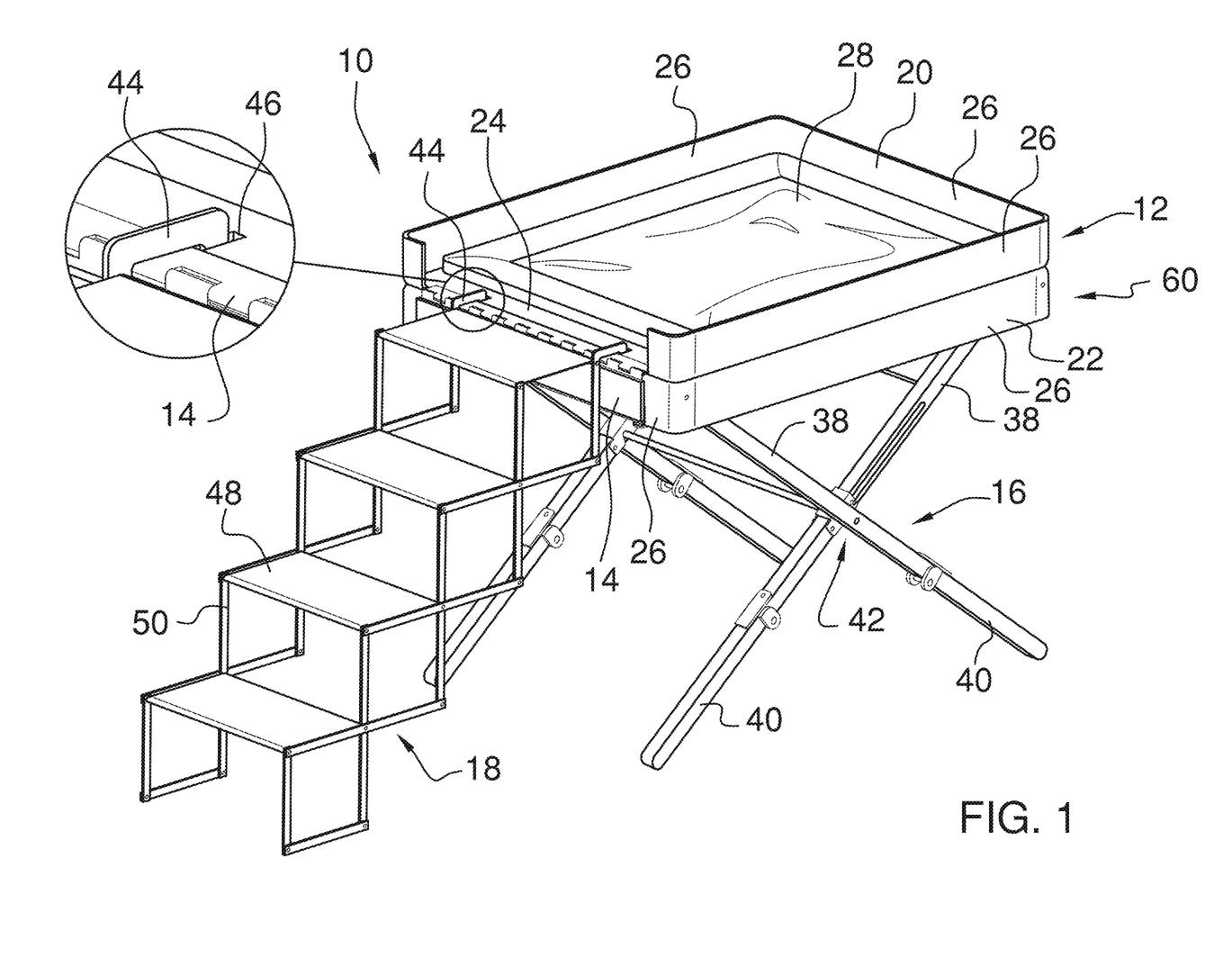
FIG. 1 is a perspective view of a collapsible pet bed according to an embodiment of the disclosure.
Figure 2:
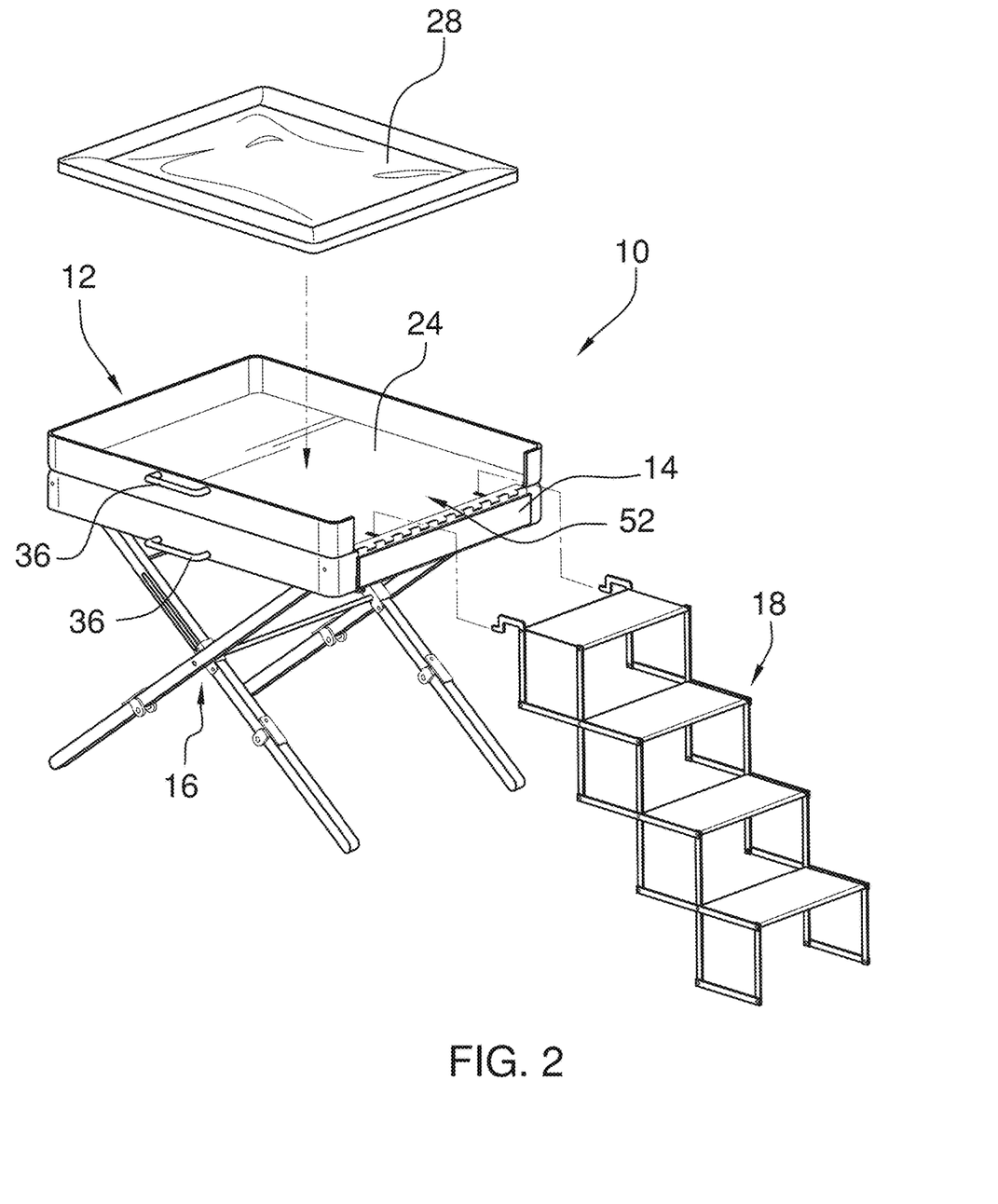
FIG. 2 is an exploded view of an embodiment of the disclosure.
Figure 3:
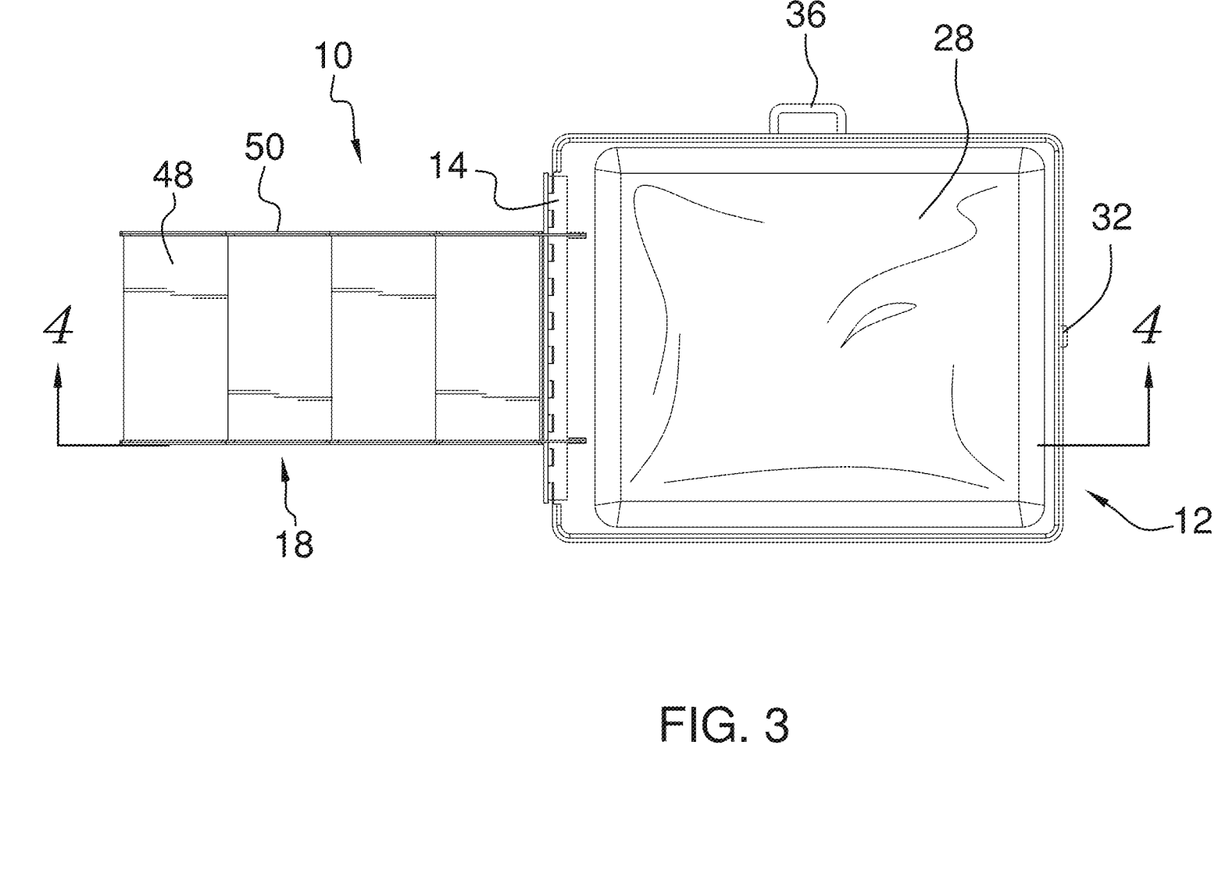
FIG. 3 is a top view of an embodiment of the disclosure.

As shown in FIGS. 1, 4, and 5, the stairs 18 include a pair of hooks 44 designed to be inserted into corresponding apertures 46 in the bottom wall 24 of each of the first tray 20 and the second tray 22 to releasably connect the stairs 18 to the clamshell container 12 in the open position 60. In the exemplary embodiment, each of the hooks 44 has an L-shaped design, though other designs are within the scope of the disclosure. The stairs 18 comprise a plurality of steps 48 attached to scissor-style side rails 50.

The bottom wall 24 of each of the first tray 20 and the second tray 22 is rectangular. The first tray 20 includes three of the side walls 26 such that the first tray 20 has an opening 52 to permit a pet to walk on and off of the first tray 20.

Figure 6:
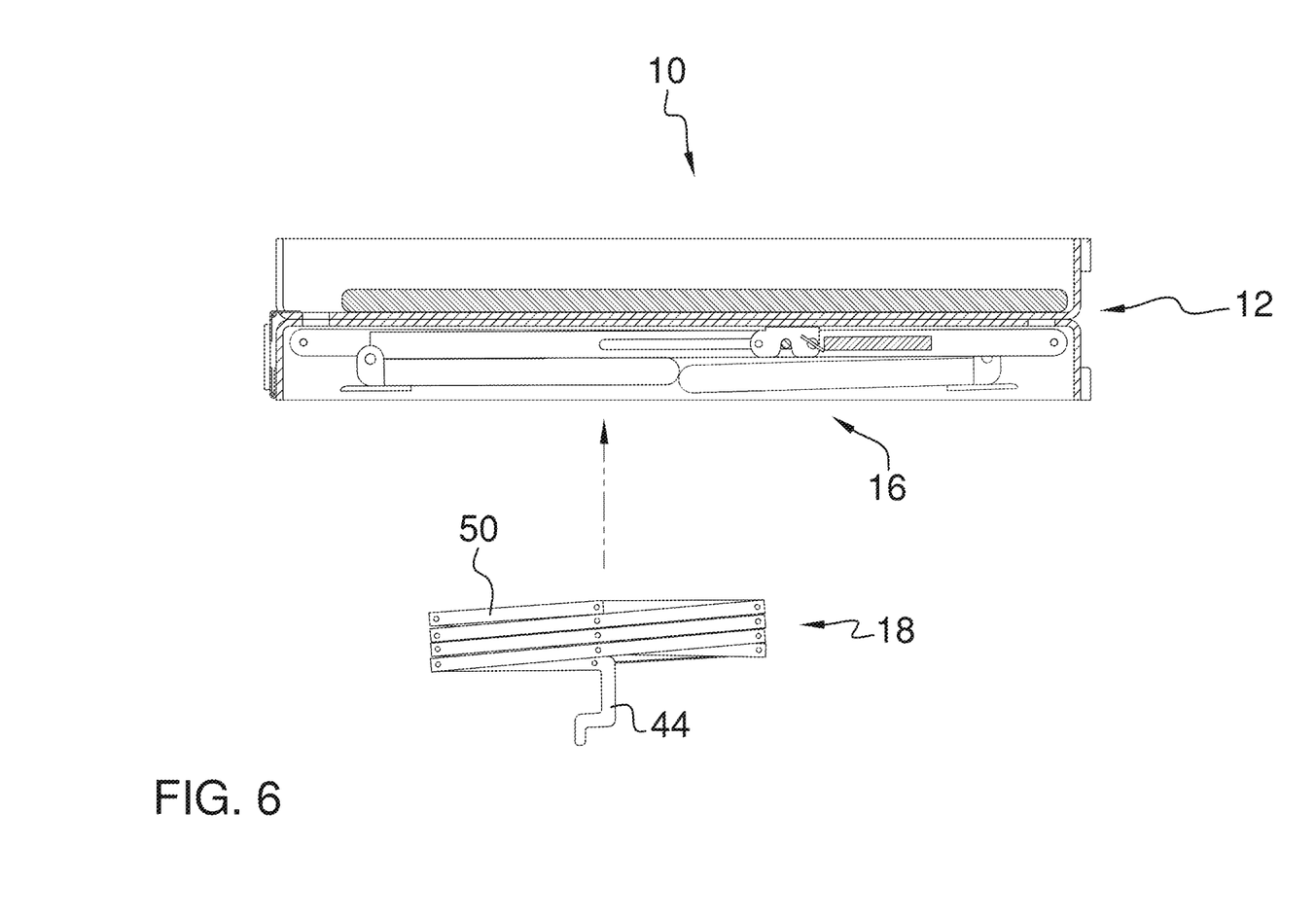
FIG. 6 is a side cross-sectional view of a portion of an embodiment of the disclosure.
Figure 7:
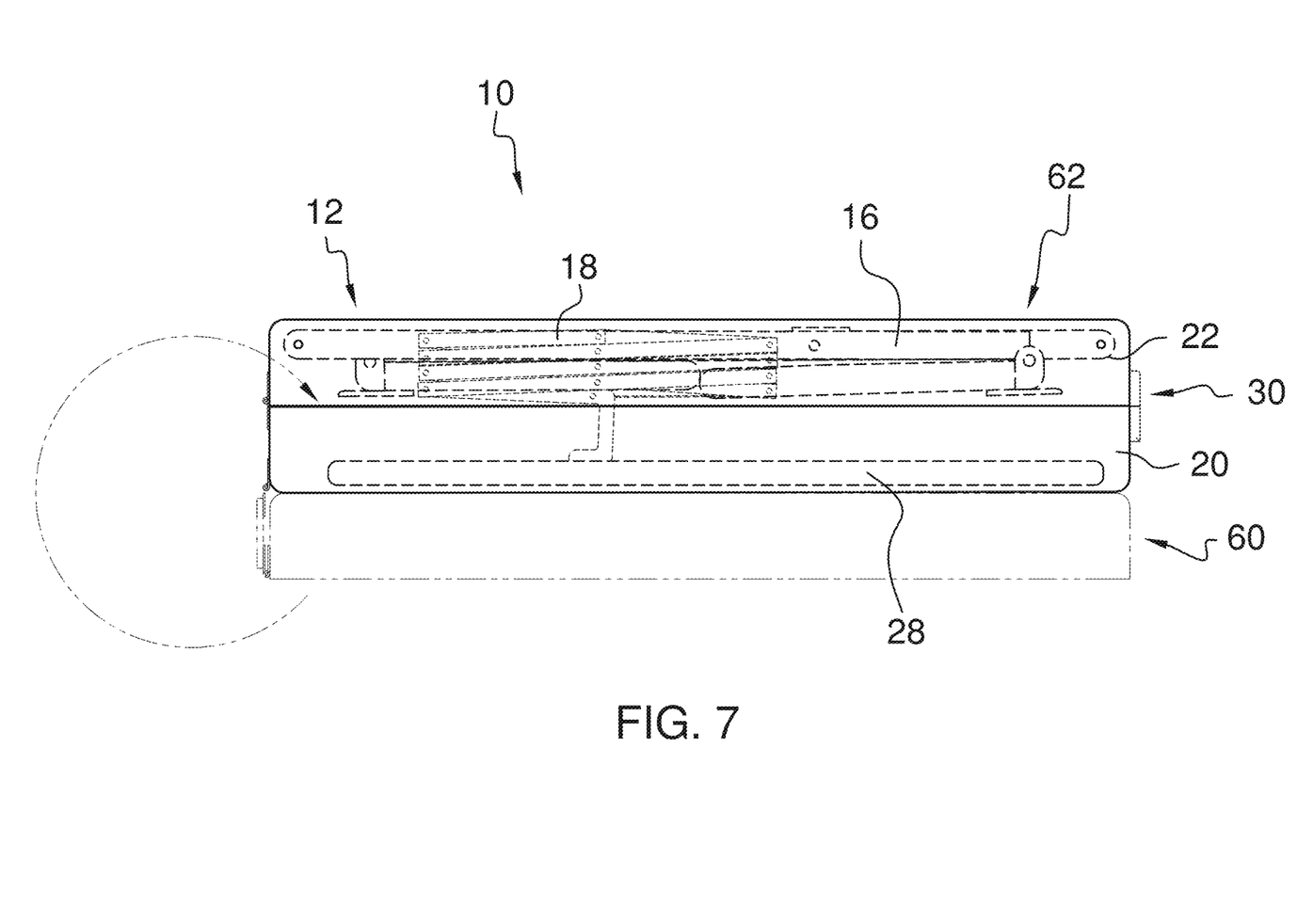
FIG. 7 is a side view of an embodiment of the disclosure.
Figure 8:
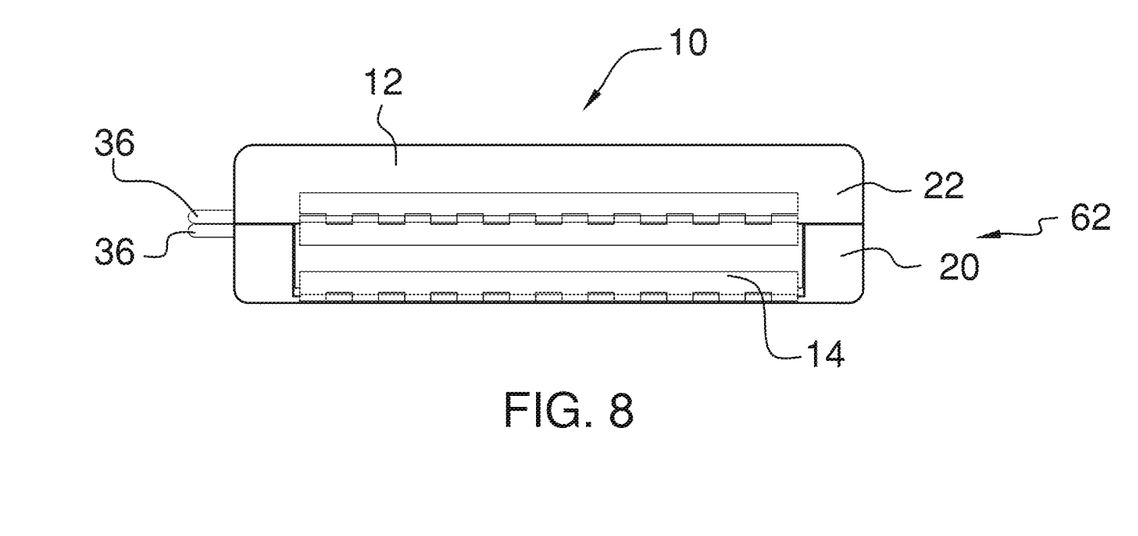
FIG. 8 is a front view of an embodiment of the disclosure.
Figure 9:
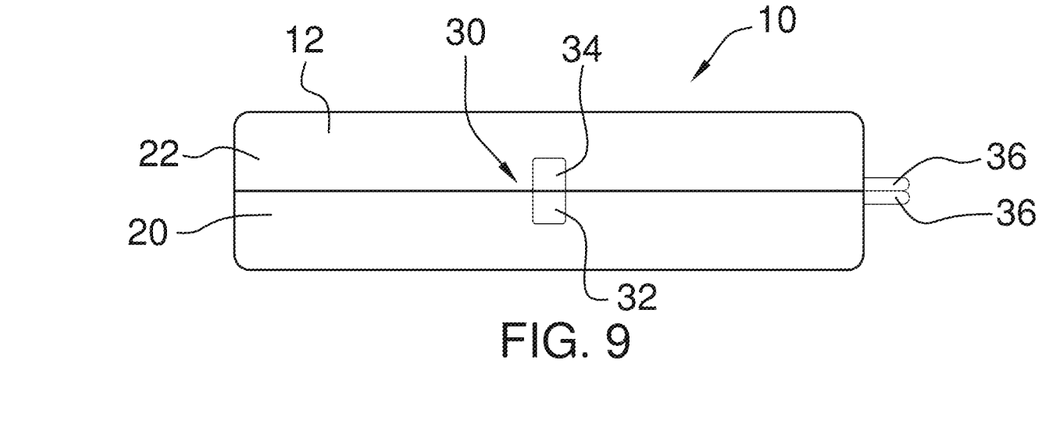
FIG. 9 is a back view of an embodiment of the disclosure.
Figure 10:
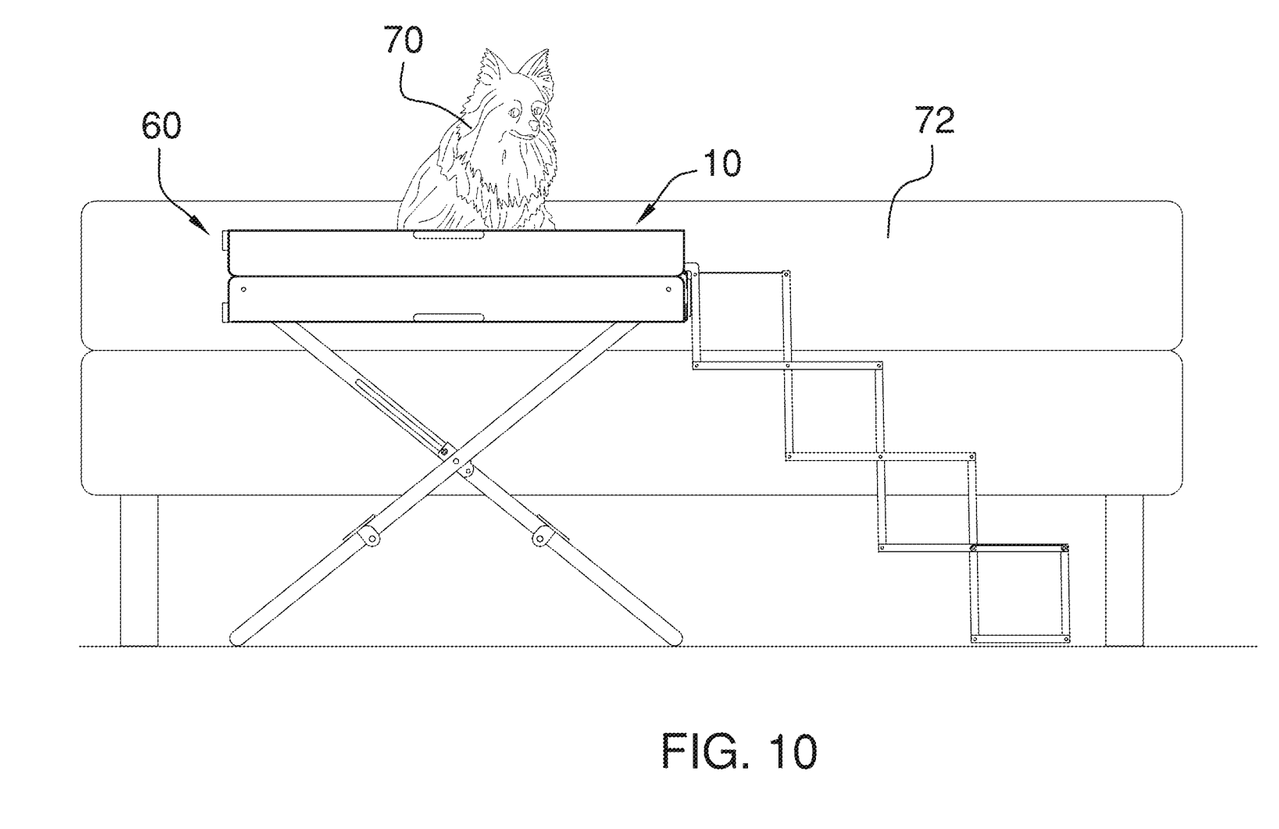
FIG. 10 is a side view of an embodiment of the disclosure in use.
Figure 11:
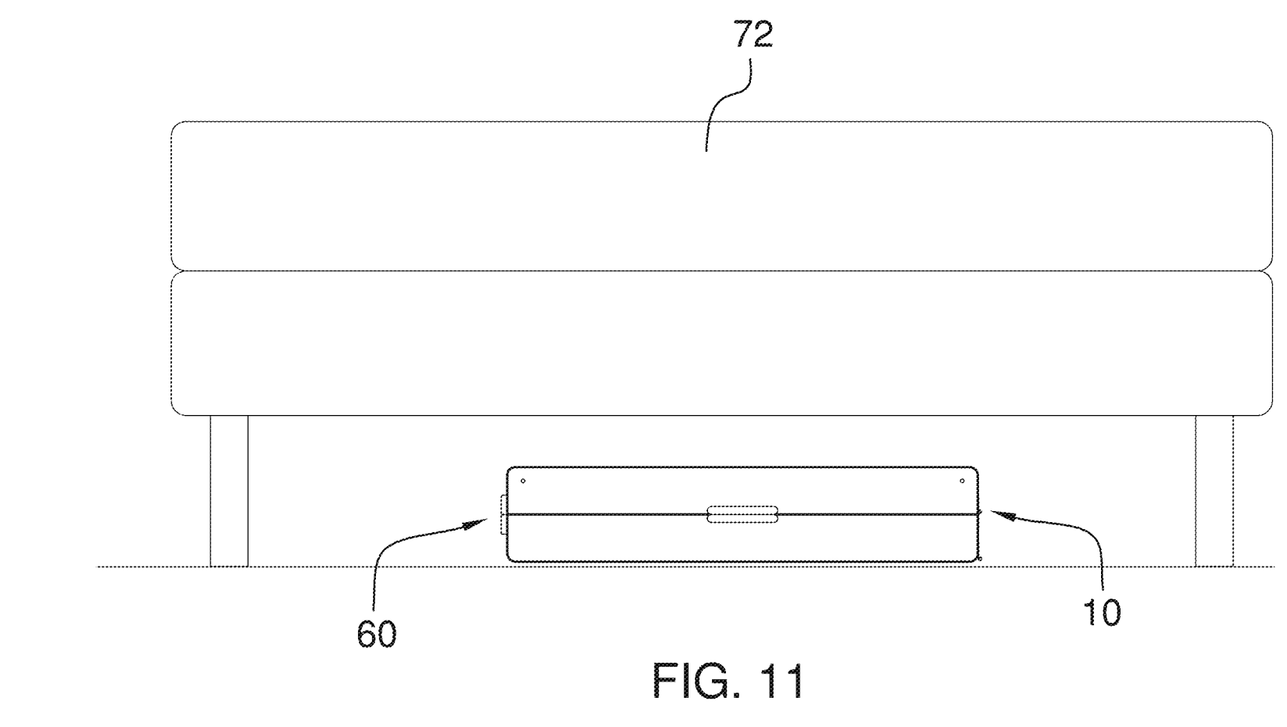
FIG. 11 is a side view of an embodiment of the disclosure in use.

The collapsible pet bed 10 is designed to support a pet, such as a dog 70 as shown in FIG. 10, at an elevated position adjacent another elevated structure, such as a human bed 72. The pet can climb up and down via the stairs 18. When not in use, the pet bed 10 can be collapsed by folding up the clamshell container 12, as shown in FIGS. 8 and 9, and then stored, such as under the human bed 72 as shown in FIG. 11. FIG. 5 shows how the stairs 18 can be disconnected and the legs 16 folded up into a flat storage position. FIG. 6 shows how the stairs 18 are also folded up for storage in the clamshell container 12. The bedding 28 can be stored in the clamshell container 12 with the stairs 18 and legs 16 as shown in FIG. 7.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A collapsible pet bed comprising:
a clamshell container comprising a first tray and a second tray, each of said first tray and said second tray comprising a bottom wall and side walls extending perpendicularly from said bottom wall;
a double hinge pivotably connecting said first tray and said second tray, said double hinge being configured to permit relative movement of said first tray and said second tray to:
an open position in which said bottom wall of said first tray abuts said bottom wall of said second tray, and
a closed position in which said side walls of said first tray abut said side walls of said second tray;
legs being pivotably attached to said second tray, said legs being extendable into an extended position to support said clamshell container a distance from a floor surface, said legs being collapsible into a collapsed position for storage inside said clamshell container; and
stairs being configured to be removably attached to said first tray to permit a pet to climb up into said first tray when said clamshell container is in said open position and a distance from a floor surface, said stairs being collapsible into a collapsed position for storage inside said clamshell container.

2. The collapsible pet bed of claim 1, further comprising bedding configured to be placed in said first tray when said clamshell container is in said open position.

3. The collapsible pet bed of claim 2, wherein said bedding is configured to be stored in said clamshell container in said closed position.

4. The collapsible pet bed of claim 1, further comprising a latch mechanism to releasably lock said first tray and said second tray together when in said closed position.

5. The collapsible pet bed of claim 4, wherein said latch mechanism comprises a first latching member mounted on one of said side walls of said first tray and a second latching member mounted on a corresponding one of said side walls of said second tray.

6. The collapsible pet bed of claim 1, further comprising a carrying handle mounted on one of said side walls of one of said first tray and said second tray.

7. The collapsible pet bed of claim 6, further comprising an additional carrying handle mounted on one of said side walls of the other of said first tray and said second tray.

8. The collapsible pet bed of claim 1, wherein each of said legs comprises an upper leg portion and a lower leg portion, said lower leg portion is pivotably connected to said upper leg portion to permit folding of said lower leg portion parallel to and abutting said upper leg portion.

9. The collapsible pet bed of claim 1, wherein said legs are divided into two pairs of legs, each of said pairs of legs is in a scissor orientation and pivotably connected by a pivot hinge.

10. The collapsible pet bed of claim 9, wherein said pivot hinge of each of said pairs of legs is slidably connected to a corresponding one of said legs to permit collapsing of said pairs of legs to an essentially flat position.

11. The collapsible pet bed of claim 1, wherein said stairs comprise a pair of hooks configured to be inserted into corresponding apertures in said bottom wall of each of said first tray and said second tray to releasably connect said stairs to said clamshell container in said open position.

12. The collapsible pet bed of claim 1, wherein said stairs comprise a plurality of steps attached to scissor-style side rails.

13. The collapsible pet bed of claim 1, wherein said bottom wall of each of said first tray and said second tray is rectangular.

14. The collapsible pet bed of claim 1, wherein said first tray comprises three of said side walls such that said first tray has an opening to permit a pet to walk on and off of said first tray.

15. A collapsible pet bed comprising:
- a clamshell container comprising a first tray and a second tray, each of said first tray and said second tray comprising a bottom wall and side walls extending perpendicularly from said bottom wall, wherein:
  - said bottom wall of each of said first tray and said second tray is rectangular;
  - said first tray comprises three of said side walls such that said first tray has an opening to permit a pet to walk on and off of said first tray;
- a double hinge pivotably connecting said first tray and said second tray, said double hinge being configured to permit relative movement of said first tray and said second tray to:
  - an open position in which said bottom wall of said first tray abuts said bottom wall of said second tray, and a closed position in which said side walls of said first tray abut said side walls of said second tray;
- legs being pivotably attached to said second tray, said legs being extendable into an extended position to support said clamshell container a distance from a floor surface, said legs being collapsible into a collapsed position for storage inside said clamshell container, wherein:
  - each of said legs comprises an upper leg portion and a lower leg portion, wherein said lower leg portion is pivotably connected to said upper leg portion to permit folding of said lower leg portion parallel to and abutting said upper leg portion;
  - said legs are divided into two pairs of legs, each of said pairs of legs is in a scissor orientation and pivotably connected by a pivot hinge;
  - said pivot hinge of each of said pairs of legs is slidably connected to a corresponding one of said legs to permit collapsing of said pairs of legs to an essentially flat position; and
- stairs being configured to be removably attached to said first tray to permit a pet to climb up into said first tray when said clamshell container is in said open position and a distance from a floor surface, said stairs being collapsible into a collapsed position for storage inside said clamshell container, wherein:
  - said stairs comprise a pair of hooks configured to be inserted into corresponding apertures in said bottom wall of each of said first tray and said second tray to releasably connect said stairs to said clamshell container in said open position;
  - said stairs comprise a plurality of steps attached to scissor-style side rails.

16. The collapsible pet bed of claim 15, further comprising:
- bedding configured to be placed in said first tray when said clamshell container is in said open position, said bedding is configured to be stored in said clamshell container in said closed position;
- a latch mechanism to releasably lock said first tray and said second tray together when in said closed position, wherein said latch mechanism comprises a first latching member mounted on one of said side walls of said first tray and a second latching member mounted on a corresponding one of said side walls of said second tray;
- a carrying handle mounted on one of said side walls of one of said first tray and said second tray; and
- an additional carrying handle mounted on one of said side walls of the other of said first tray and said second tray.

* * * * *